United States Patent
Cebis et al.

(10) Patent No.: US 6,208,131 B1
(45) Date of Patent: Mar. 27, 2001

(54) ELECTRONIC POSITION AND SPEED SENSING DEVICE

(75) Inventors: Martin John Cebis, Wembley Downs; Steven Michael Basso, Bedford, both of (AU)

(73) Assignee: Oribatal Engine Company, Balcatta (AU)

( * ) Notice: Subject to any disclaimer, the term of this patent is extended or adjusted under 35 U.S.C. 154(b) by 0 days.

(21) Appl. No.: 09/068,458

(22) PCT Filed: Nov. 20, 1996

(86) PCT No.: PCT/AU96/00736

§ 371 Date: May 12, 1998

§ 102(e) Date: May 12, 1998

(87) PCT Pub. No.: WO97/19358

PCT Pub. Date: May 29, 1997

(30) Foreign Application Priority Data

Nov. 20, 1995 (AU) .................................................. PN6675

(51) Int. Cl.[7] .................................................. G01P 13/00
(52) U.S. Cl. ............... 324/165; 324/207.22; 324/207.25; 340/672; 123/406.58; 123/617
(58) Field of Search .................................... 324/165, 168, 324/207.25, 207.22, 166, 160, 207.2; 360/107; 340/672; 123/406.58, 617

(56) References Cited

U.S. PATENT DOCUMENTS 4,409,548 10/1983 Focht .................................... 324/168
4,700,305 10/1987 Lotterbach et al. .................. 364/431
5,371,460 12/1994 Coffman et al. ..................... 324/165
5,414,579 5/1995 Uhde et al. ........................... 360/107

FOREIGN PATENT DOCUMENTS 196 14 164    4/1995  (DE) .
2444274      12/1979  (FR) .
2059598       4/1981  (GB) .

OTHER PUBLICATIONS

International Publication No. WO 90/06517, published Jun. 14, 1990.
Derwent Abstract Accession No. D5393B/16, class R17.

Primary Examiner—Christine Oda
Assistant Examiner—Anthony Jolly
(74) Attorney, Agent, or Firm—Arent Fox Kintner Plotkin & Kahn PLLC (57) ABSTRACT

A position and speed sensor comprising a circular element (1) rotatably driven about its axis. The circular element (1) has two position indicators (3, 4) of different angular width. A sensor means (5) is fixed in position with respect to and adjacent to the circular element (1). The sensor means (5) has a sensing element for sensing the passage of each of the position indicators (3, 4) past the sensing clement. An electrical signal is produced by the sensor means (5) corresponding to the passage of each of the sensed position indicators (3, 4). The signal has a duration corresponding to the angular widths of the sensed position indicators (3, 4). Also included is a means to process the electrical signal to produce information as to the angular position and angular velocity of the circular element. A method for reverse rotation detection using the position and speed sensor means (5) is also disclosed.

43 Claims, 2 Drawing Sheets

ELECTRONIC POSITION AND SPEED SENSING DEVICE

This invention relates to electronic position and speed sensors and, in particular, to position and speed sensors suitable for use in determining the timing for injection and ignition of combustible mixtures, for example, in spark ignited engines.

Conventional position and speed sensor devices for use in multi-cylinder engines, commonly referred to as "encoders", typically comprise a wheel or disc which rotates at a speed which is a fraction of, or which is synchronous with, the speed of the engine crankshaft. These discs are commonly provided with a plurality of position indicators or markers and specific position indicators on their periphery which, upon passing a sensor, generate a train of pulses which may be analysed to determine the speed and position of the crankshaft and hence pistons in each cylinder of the engine.

The need for accuracy of the position and speed data produced by such sensing devices typically dictates that a large number of markers, usually teeth, notches, magnetic strips or other markers that can readily be detected by a sensor, are required to be provided on the disc. Generally, many equispaced teeth will be distributed around the circumference of an encoder disc to provide good angular resolution with factors of 360° being preferred, for example 15°, 30° or 45°. The teeth, together with the or a number of sensors, will generate the electrical signals that enable determination of speed and position at sufficient accuracy to be useful in the control of the operation of the engine.

It is to be understood that the need for sensing of specific position indicators which identify the top dead centre (TDC) position of each piston in each cylinder of the multi-cylinder engine creates particular problems. The sensing of the correct TDC position for each cylinder is critical to the determination of the appropriate ignition time, and sometimes injection time, to produce the combustible mixture required in each cylinder. Failure to determine the TDC position accurately may give rise to problems of misfiring of the engine and as a consequence, engine performance may be adversely affected.

Such failures are likely unless the sensing device is of a high sophistication because the many variables at play in the operation of the engine may create obstacles to the accurate determination of the TDC position or, indeed, any other pertinent position of the piston in each cylinder. For example, between markers, pulses are positioned using interpolation, usually without taking acceleration into account as this is difficult to measure. As a result, ignition and injection events may be timed incorrectly due to variations in the speed of rotation of the crankshaft in response to acceleration or deceleration causing the signal pulses to not occur at the desired angle and be of a shorter or longer duration. This effect worsens as the number of markers is reduced. In a case where the specific position indicator has only a slightly different angular width from other position indicators, this being a typical case in order to establish an absolute angular position, discrimination of specific position indicators can be difficult. Further, in a two cycle engine that is directly injected, it will be appreciated that an injection event and an ignition event occurs each revolution of the crankshaft rather than every two revolutions as is the case in a four stroke cycle engine. Therefore, sophisticated circuitry is required to ensure that correct control over injection and ignition timing occurs in the lesser time interval than would be available, for example, in a four cycle engine.

A still further problem has been that many prior art systems do not have the capability to provide an indication of rotation of an engine in a direction contrary to that desired. The consequences of incorrect rotation can be highly detrimental to the performance and life of the engine.

U.S. Pat. No. 4,941,445 assigned to Motorola Inc., discloses an electronic position sensor assembly with two sensing elements to provide separate, independent position signals related to multi-cylinder engine cycle control by sensing the angular position of an engine rotated slotted wheel. Specific position indicators of three different angular widths are required whilst a large number of position indicators are provided to generate position and engine speed data of sufficient accuracy for engine control. In addition to the dual sensing elements, a sophisticated control unit is required for analysis of the dual independent train of pulses produced. Needless to say, a two sensor, multi-tooth construction position sensor assembly with specific position indicators of several angular widths, whilst being a complicated arrangement, is also relatively costly to manufacture.

Australian Patent No. 626828 assigned to Caterpillar Inc., discloses an apparatus with a toothed wheel having a plurality of markers, the specific position indicators of which have a different angular extent to the other position indicators. In this case, a single sensor is relied upon to provide the required position and speed data. Again, the multi-tooth construction is relatively costly to manufacture.

A difficulty with each of the above proposals is that manufacture is problematic and accordingly expensive, especially in developing countries. In this regard, encoder wheels or discs of the kind described above require to be cast with very tight tolerances since the spacing of teeth, notches or other types of marker is crucial to the performance of the sensors as discussed above. The combination of these factors creates expense that can reach intolerable levels in developing countries which may not have access to equipment required for undertaking such manufacturing operations. In addition, the market may not be prepared to pay the premium for sensors which are manufactured by this process.

It is the object of the present invention to provide an engine position and speed sensor that reduces or alleviates at least some of the problems referred to above.

With this object in view, the present invention provides a position and speed sensor comprising:
 a circular element rotatably driven about an axis thereof, said circular element having two position indicators of different angular width arranged thereon;
 a sensor means fixed in position with respect to and adjacent to the circular element, the sensor means having a sensing element for sensing the passage of each of the position indicators past the sensing element and producing in response thereto an electrical signal corresponding to the passage of each of the sensed position indicators and having a duration corresponding to the angular widths of the sensed position indicators; and
 means to process the electrical signal to produce information as to the angular position and angular velocity of the circular element.

Preferably, the two position indicators are the only position indicators provided on the circular element.

Preferably, in addition to providing information as to angular position and angular velocity, the means to process the electrical signal may additionally produce information as to the direction of rotation of the circular element.

Conveniently, the position and speed sensor is an electronic position and speed sensor and the circular element is arranged to rotate at a speed which is a fraction or multiple of, or which is synchronous with, the speed of rotation of a crankshaft of an engine. Preferably, the position indicators are sensed in turn by the sensing element such that the sensing of a second position indicator occurs very shortly after the sensing of a first position indicator.

The location of the two position indicators may be arbitrarily selected but should be such that the separation distance therebetween does not cause problems from the point of view of discrimination of one position indicator from the other, particularly so that transient acceleration and deceleration events may be compensated for and the most up-to-date information may be provided on angular velocity and position to achieve accurate scheduling of critical engine events and determination of the direction of rotation.

Conveniently, the preferably two position indicators are located on the circular element such that angular velocity and position may be determined under most engine operating conditions immediately prior to when this information is required for the purpose of scheduling ignition and injection events. That is, the preferably two position indicators are located at an angular position which is angularly spaced from another specific angular position corresponding to a specific position of the engine, for example the top dead centre (TDC) position of a cylinder of the engine, by a known angular width. This known angular width may be determined on the basis of where, in angular terms, certain events such as ignition and injection typically are required to occur in relation to a TDC position.

Preferably, the first position indicator will be located within 140° of arc from a position corresponding to the TDC of a cylinder of the engine, which TDC position may conveniently, but need not necessarily, be marked by a discrete position indicator on the circular element. The second position indicator may be located between the first position indicator and the TDC position of the piston at a position advantageous from the point of view of ease and accuracy of determination of the timing of required ignition or injection events. For example, the centre of the other position indicator may be located 15° or more, preferably 25°, of arc from the centre of the first position indicator.

The position indicators, not located at positions corresponding to injection or ignition events but prior, preferably no more than 140° prior, to these events, are advantageously spaced greater than about 10° apart to enable simple processing of signals indicating passage of the first position indicator prior to passage of the second position indicator. Appropriate spacing of the position indicators also facilitates manufacture of the circular element in a single stamping process.

Moreover, one position indicator is advantageously chosen to be of larger angular width or extent than the other thereby allowing ease of discrimination of the position indicators and the production of rotational direction information as will be described in more detail below.

Preferably, when the engine is rotating in the correct direction, the larger of the position indicators is sensed by the sensing element after the smaller of the position indicators has been sensed. This may be particularly desirable where the position indicators are associated with, or arranged in advance of, the TDC position of a cylinder. In this case, as cylinder pressure increases as a piston approaches TDC, the piston movement slows tending to cause the second of the position indicators to appear larger than it is. In other words, as the speed of rotation of the circular element or disc slows due to the piston approaching TDC, the second position indicator is sensed for a greater time than it would be if the piston was not approaching TDC. Hence, if the position indicators were arranged in the opposite sense such that the smaller indicator followed the larger indicator past the sensing element, the smaller position indicator may, on occasion, appear larger due to the reduction in rotational speed of the circular element. This could cause difficulty in discrimination between the two position indicators.

Similarly, the above arrangement of the position indicators is desirable to enable ease of discrimination in situations where a rapid acceleration or deceleration may occur as the first position indicator is being, or has been, sensed. A similar principle to that described above may occur with the trailing position indicator appearing smaller or larger, respectively, and so the above arrangement of position indicators conveniently accounts for such situations.

The position and speed sensor of the present invention is particularly applicable to single cylinder engines. Advantageously, a single sensor means is utilised in the case of a single cylinder engine, thus making the engine control unit circuitry simpler and achieving an advantage from the point of view of manufacturing cost of the engine.

The position and speed sensor may however equally be applied to multicylinder engines. For example, two sensor means could be used, optionally spaced 180° apart about the periphery of the circular element. Alternatively, two sets of position indicators could be employed on the circular element with a single sensor means. Further, one position indicator spaced about 180° from the first pair of position indicators could be included. In this latter case, timing of events for the other cylinder(s) may be enhanced by employment of the additional position indicator whilst reverse rotation detection may still be achieved through use of the first pair of position indicators.

The above engine speed and position sensor therefore provides the time of passage of the position indicators and, as the position indicators are of known different angular extent and the relationship between the position of the position indicators and the TDC position is also known, in the absence of the optional TDC position indicator, the timing of passage of the TDC position can readily be calculated by simple means. Equally, the timing of significant engine events, such as injection and ignition, can likewise be determined with sufficient accuracy to achieve acceptable control over engine performance. Such accuracy is especially important for direct injected two stroke engines wherein the timing of fuel injection and ignition events, being over a shorter time interval and closer together than in a four stroke engine, is especially critical. In engines currently being developed by the applicant, there may be an especially important relationship between, for example, occurrence of ignition and injection events. That is, there may, for example, be a particular interlock between the start of injection and the initiation of ignition for a given speed-load characteristic.

Preferably, the position indicators may be positioned and arranged such that the angular extent between the position indicators is a factor of the extent between the second position indicator to be sensed in a rotation of the circular element and the TDC position. This is convenient from the point of view of processing allowing simpler shift register controllers to be employed.

The engine position and speed sensor may, as noted above, also be used to determine the direction of rotation of the engine. Thus the invention also provides a method of determining the direction of rotation of an engine wherein the passage of two position indicators of different angular width located on an encoder wheel is sensed by a sensor means comprising comparing data derived from an electrical signal corresponding to passage of said position indicators past said sensor means under engine operating conditions with data corresponding to an electrical signal for a first direction of rotation and indicating rotation direction in an opposite sense to said first direction where said derived data varies by a greater than acceptable margin from data corresponding to said first direction of rotation.

Engine operating conditions may typically refer to the electrical signal generated upon first rotation or attempted start-up of the engine or at idle (typically below 2000 rpm). Preferably, the position indicators are of differing angular extents such that the passage thereby past the sensor means results in the production of electrical signals which are capable of easy discrimination as indicated hereinbefore.

Although the entire electrical signal derived from the passage of a position indicator past said sensor means under engine operating conditions could be used for the above mentioned comparison, conveniently, the derived data from the electrical signal is less extensive and may be selected from the signal duration, signal amplitude or other parameters or derivatives therefrom. This may make processing more convenient and cost effective.

The derived data is obtained from "conditioning" of the original electrical signal. Essentially, the derived data enables a more useful or favourable part of the electrical signal to be processed. For example, it may not be desirable to work with negative voltages and hence the derived data may be based, for example, only on a first positive portion of the electrical signal. Typically, the reduced information contained in the derived data is represented by a digital signal which is easy to work with in terms of processing. The derived data may be processed in an algorithm to provide values which are compared by reference to a look-up map in a microprocessor or other means to assess the direction of rotation of the engine.

In one such embodiment, signal durations corresponding to each of the position indicators may be compared and, consequential upon the determination, the direction of rotation of the engine may be obtained, for example, in the following manner. The pulse duration corresponding to the passage past the sensor means of a first position indicator of shorter circumferential dimension than a second position indicator is $t_1$. The pulse duration corresponding to the passage past the sensor means of the second position indicator of greater circumferential dimension is $t_2$. The duration between the end of the first pulse corresponding to the first position indicator and the end of the second pulse corresponding to the second position indicator is $t_3$ and that between the end of the first position indicator pulse and the commencement of the succeeding first position indicator pulse is $t_4$. If $nt_3 < t_4$, n being any number less than $t_4/t_3$, where $t_4$ and $t_3$ are calculated whilst the engine is rotating in the correct direction, this value preferably being selected to allow simpler processing by cheaper microprocessors, engine rotation is in a first correct direction. If $nt_3 > t_4$, the direction of rotation is in a second incorrect direction contrary to the first direction. $t_4$ could also be subjected to multiplication by a factor, m, preferably equal to 1 though any desired factor could be used. Allowance may be made for any error in the signal data. By sensing the direction of rotation, a condition of rotation that may cause failure of the engine due to serious damage thereof can be avoided. For example, in such a situation where reverse rotation of the engine is detected, injection of fuel may be stopped or other action taken such as prevention of ignition eventually causing the engine to come to a stand-still. This simply lets the operator know that there is a fault condition and allows the operator to attempt to restart the engine. This feature may be especially applicable to manual-start engines such as pull and kick-start engines.

Detection of reverse rotation is advantageously dependent upon the first and second position indicators being arranged as alluded to hereinabove, namely, such that the indicator of greater angular extent ordinarily passes the sensor after the indicator of smaller angular extent.

Therefore, in accordance with a further aspect of the present invention, there is provided a method of determining the direction of rotation of an engine wherein the passage of two position indicators of different angular width located on an encoder wheel is sensed by a sensor means to provide an electrical signal corresponding to the passage of each respective position indicator, each signal having a leading edge and a trailing edge, the timing, $t_3$, between passage of the trailing edges of the electrical signals corresponding to each position indicator being multiplied by a factor of n and compared with the timing, $t_4$, of passage between the trailing edge of a first position indicator and the leading edge of the first position indicator on a subsequent revolution of the encoder wheel wherein n is less than $t_4/t_3$ and is calculated on the basis of rotation in the correct direction such that, when $nt_3 < mt_4$, rotation is determined as being in the correct direction and when $nt_3 > mt_4$, rotation is in the incorrect direction.

Conveniently, n is 2 and m is 1, but any multiplier conveniently implemented by a simple microprocessor could be used. Allowance may be made for any error in the signal data. Other variations may be included within this aspect of the invention directed to reverse rotation detection. For example, $t_3$ could be equal to the timing between the passage of the leading edge of the first position indicator and the trailing edge of the second position indicator. $t_4$ could equally be the timing between passage of the trailing edge of the first position indicator and the trailing edge of the first position indicator on a subsequent revolution of the encoder.

The above method of reverse rotation detection is applicable to any multitooth encoder provided that at least two position indicators of different angular width are spaced about the periphery of the encoder wheel.

For example, in the case of a 24 tooth encoder with one tooth missing (23 actual teeth) and one position indicator, A, of lesser angular extent than the remaining teeth, B, A and B may be used together with the space therebetween to determine the direction of rotation.

If the engine is rotating in a correct direction, the expected sequence of events is A, missing tooth or space, B. If the order is reversed, there is reverse rotation. An advantage here is that high accuracy speed and position indication may be achieved while providing determination of a direction of rotation.

Preferably, the sensor means is of inexpensive construction and magnetic reluctance or inductive type sensors may be considered most convenient, though other sensor means, for example optical sensors and Hall-effect sensors, may also be employed.

The operation of the position and speed sensor will be better understood from the following description of the construction and operation thereof made with reference to the accompanying drawings in which.

Figure 1:
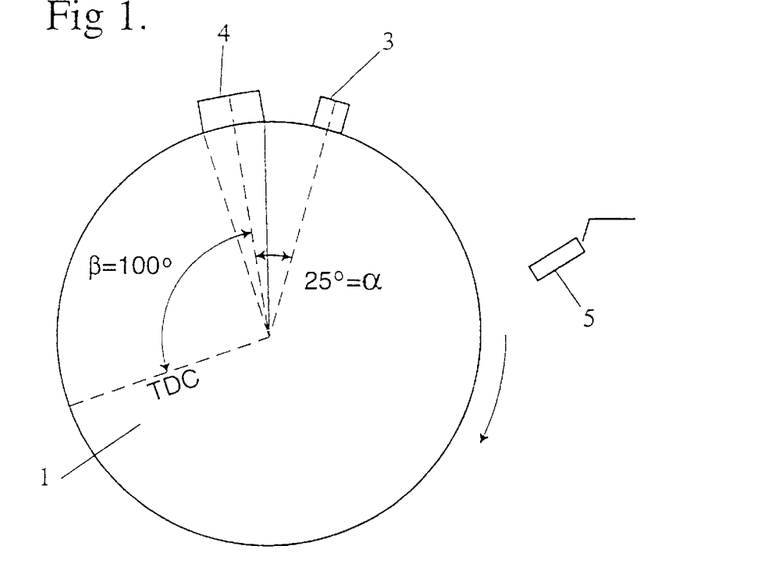
FIG. 1 is a schematic diagram of a sensor and encoder wheel in accordance with the invention.

Referring now to FIG. 1, there is shown an encoder wheel 1 which rotates about an imaginary axis 2 passing through the length of a crankshaft of an engine (not shown). The encoder wheel 1 rotates at a speed synchronously with, or a fraction of, say half, the speed of the crankshaft.

Spaced about the periphery of the encoder wheel 1 there are two position indicators, a first position indicator 3 and a second position indicator 4. The second position indicator 4 has greater angular extent than first position indicator 3.

The position indicators 3 and 4 may conveniently be manufactured from, or include a portion of, a magnetic material, a reflective material, or a material that can be sensed by a sensor 5 which is located in proximity to the encoder wheel 1. The sensor 5 is located in a position, advantageously adjacent the encoder wheel 1, to enable sensing, in turn, of the passage of the position indicators 3 and 4 past the sensor 5. Where a magnetic material is included within position indicators 3 and 4, the sensor 5 may be a reluctance type sensor that senses changes in magnetic field strength during passage of position indicators 3 and 4 thereby. Put simply, passage of a magnetic material past a reluctance type sensor induces a voltage in the sensor which can be recorded and the determination of the magnitude thereof which can be used to provide an electrical signal representative of such passage as shown in trace A of FIG. 2 which will be discussed further below.

Of course, the sensor 5 need not be a reluctance type sensor and the encoder wheel 1 need not incorporate magnetic materials. In this regard, the only requirement of sensor 5 is that it readily sense passage of position indicators 3 and 4, though the use of inexpensive sensor types are preferred. For example, an optical sensor could be used to sense changes in reflectance or transmission as the position indicators 3 and 4 pass sensor 5 or alternatively a Hall Effect or other sensor could be used.

Further, the position indicators 3 and 4 need not be in the form of teeth; notches or any other convenient design for the indicators 3 and 4 could be used. Nonetheless, it is preferable to employ a construction of position indicator that is both cost effective to manufacture and easy to sense. The emphasis is upon ease of detection of the passage of the position indicators 3 and 4 and ease of utilisation of an electrical signal demonstrating passage of the position indicators 3 and 4 to provide information useful in the control of an internal combustion engine.

The position indicators 3 and 4 are advantageously to be spaced apart by an angle which enables ready discrimination between electrical signals representative of the passage of the position indicators 3 and 4 past sensor 5. For reasons that will become apparent below, the angular extent of position indicator 4 is advantageously a multiple of the angular extent of position indicator 3. For example, the position indicator 4 could have an angular extent of 10° and the position indicator 3 an angular extent of 5°. Ease of manufacture, detection and a desire to ensure durability of the encoder wheel 1 may play a role in the determination of the angular extent selected. For example, if the teeth constituting the position indicators 3 and 4 are too narrow, detection may be difficult or the risk of damage to the teeth resulting in a detrimental effect on the accuracy of detection may be too great.

Further, if the position indicators 3 and 4 are too similar in terms of their angular extent, the following problem may arise. As will be understood, the crankshaft of the engine may exhibit, under normal operating conditions, variable acceleration or deceleration behaviour. Further, such transient acceleration or deceleration behaviour may occur during a single revolution of the engine. The potential effects of such variable acceleration or deceleration behaviour may be inferred from consideration of FIG. 2, trace B, where the signals corresponding to each position indicator 3 and 4 are illustrated. As position indicators become more similar in regards to angular extent, the signals become more similar. If the factors of acceleration and deceleration are brought into play, it will be seen that the signals representing passage of each position indicator 3 and 4 may become more alike, in which case the discrimination between the signals that is essential for determining the direction of rotation, accurate control over the timing of injection and ignition events, and, consequently, essential to efficient operation of the engine, will be lost. The sensor 5 would in effect then become almost useless under conditions of variable acceleration or deceleration.

For example, if the position indicator 4 of larger angular extent was only marginally larger than the other position indicator 3 and the larger indicator 4 followed the smaller indicator 3 past the sensor 5, a transient acceleration of the encoder wheel 1 just after the smaller indicator 3 had passed, or was passing, the sensor 5 would result in the signal generated by passage of the larger indicator 4 appearing smaller due to its faster rate of passage past the sensor 5. In this situation, the signals generated by passage of the two indicators 3 and 4 may become indistinguishable. Poor discrimination may then result. This problem may be largely avoided by appropriate selection of angular extent for the indicators 3 and 4.

Further to the use of different angular widths, the mid-points of position indicators 3 and 4 are placed apart an angle $\alpha$ that is sufficient to enable discrimination between the electrical signals corresponding to the passage of position indicators 3 and 4 past the sensor 5 over the full range of acceleration and/or deceleration likely to be experienced by the engine. This may be determined by trial and error, and a range of 10° to 40° will provide an angle between the midpoints of the position indicators 3 and 4 suitable to allow discrimination under most engine operating conditions. Similarly, a ratio, R, of angular extent of the position indicators 3 and 4 of 1.5:1 to 3:1 will provide acceptable discrimination under engine operating conditions. Nonetheless, it should be noted that different ratios R of angular extent of the position indicators 3 and 4 may be used where alternative sensors such as Hall Effect or optical sensors are used. It will be seen that $\alpha$ is 25° and R is 2:1 in the case of the encoder wheel 1 as shown in FIG. 1.

It is to be noted, however, that the angular extent of a position indicator cannot exceed a certain value where zero crossing detection is employed as indeterminacy of a resultant signal's zero crossing as described further hereinafter may result. Further, the angular extents should not be less than a certain value to avoid signals of too small an amplitude to be useful in determination of engine position and speed.

The mid-point of position indicator 4 is spaced a known angular extent B from the position on the encoder wheel 1 corresponding to the top dead centre (TDC) position of a piston within the engine cylinder (not shown). This TDC position is simply denoted "TDC" in FIG. 1 and is determined by experiment. It is to be noted that, as alluded to hereinbefore, an optional TDC position indicator can be provided on the encoder wheel 1, if desired.

The angular extent β may be arbitrarily selected, but is preferably within an angular extent in which most events of significance to the control of the engine occur. Conveniently, β may be between 80° and 120° from TDC. In the encoder wheel 1 shown in FIG. 1, β subtends 100° before top dead centre (BTDC). Within this sector, most events involved in the control of the engine, namely injection and ignition, will occur. However, the invention is in no way to be taken to be limited to control of engine events occurring in the range 0° to 100° BTDC. Hence, the position indicators 3 and 4 are located on the encoder wheel 1 such that angular velocity and position information may be determined under most engine operating conditions prior to when it is required for the purpose of scheduling ignition and injection events.

Figure 2:
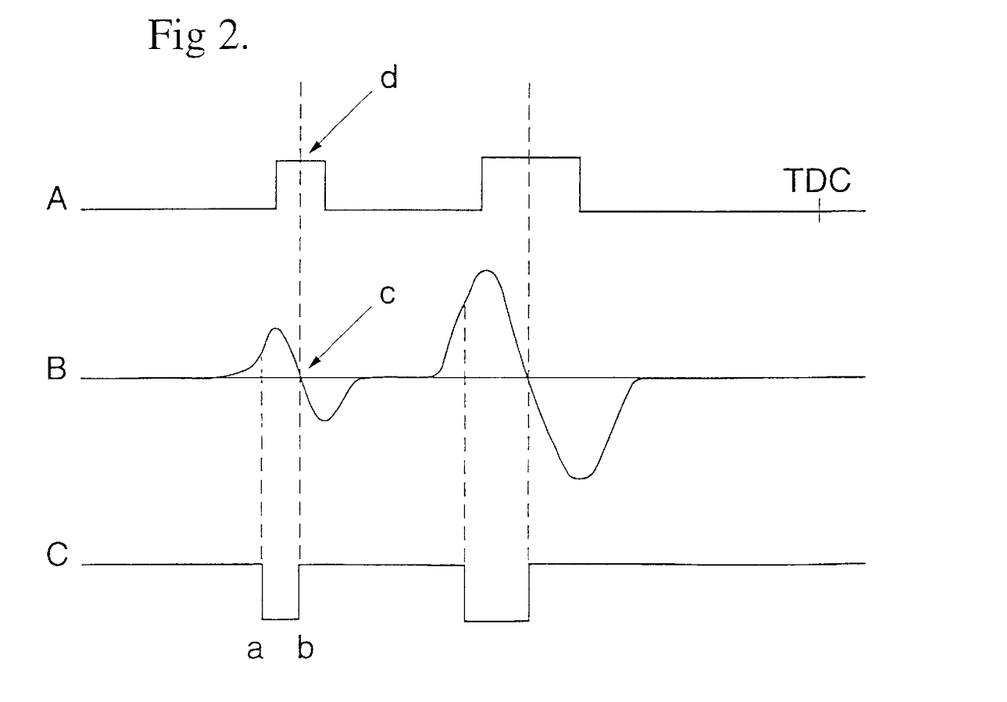
FIG. 2 shows the physical extent of the position indicators, a series of electrical signals produced by the sensor means of FIG. 1 and a processed signal produced by associated circuitry for control of ignition and injection events in a two stroke cycle engine.

Referring now to FIG. 2, this illustrates the angular extent of the position indicators 3 and 4, an electrical signal trace produced by the sensor 5 when the position and speed sensor of the present invention is employed and a resultant processed signal trace used in control of the engine.

Trace A indicates the physical extent of position indicators 3 and 4. Trace B corresponds to an electrical signal produced from the passage of position indicators 3 and 4, in turn, past sensor 5 where sensor 5 is an inductive type pick-up. Trace C shows the resultant signal after processing. As position indicator 3 nears sensor 5, a voltage signal is induced which is represented by trace B. The position portion of the voltage signal from the sensor 5 is employed in processing. Thus the first edge, a corresponding to position indicator 3 is triggered when the rising signal of the trace B passes through a predetermined threshold and the second edge b is triggered when the signal of trace B passes through zero at c, corresponding exactly to the centre d of the displacement of the position indicator 3 giving an accurate angular reference. Similar behaviour is recorded in the case of position indicator 4.

As mentioned hereinbefore, the order of passage of the position indicators 3 and 4, position indicator 3 being of narrower angular extent than position indicator 4, is not coincidental. As the location of the position indicator 4 on the encoder wheel 1 as it passes sensor 5 corresponds to when the engine will be slowing down as the piston approaches TDC, discrimination is enhanced because the electrical signal corresponding to position indicator 3 which is narrow is easily distinguishable from the electrical signal corresponding to position indicator 4 which tends to widen. Thus, contrast between the two electrical signals is enhanced which aids discrimination and increases the quality of the position and speed information used in the control of the operation of the engine.

As noted above, the recorded voltage induced in sensor 5 in response to passage of position indicators 3 and 4 past sensor 5 passes through zero as the mid-point of each position indicator 3, 4 passes the sensor 5. Therefore, detection of the instant at which passage of the voltage through zero occurs will enable determination of the times at which the mid-point of each of the position indicators 3 and 4 passes the sensor 5. Further, the magnitude of the voltage signal which reflects which position indicator 3, 4 is passing the sensor 5 at any given time may be used to assist in determining which position indicator 3, 4 has passed the sensor 5. In such a way, the angular speed of the engine may be determined from the time taken for position indicator 4 to pass the sensor 5 once the position indicator 3 has passed the sensor 5, that is, the difference in the sensing times of the position indicators 3 and 4. Further, because the TDC position is spaced a known angular extent from each of the position indicators 3 and 4, the position of the piston in a cylinder of the engine, with respect to TDC, may be readily determined at any given point in time. In this manner, accurate timing of engine events such as injection for either fuel or air as appropriate and ignition may be achieved. By establishing the speed of rotation just prior to the required timing of these events, accuracy is enhanced without complex circuitry and processing.

The circuitry for analysis of the position of TDC and the other necessary events may consequently be very simple. For example, it is known that for the encoder wheel 1 shown in FIG. 1, passage of the TDC position of the piston occurs 100° after the mid-point of position indicator 4. Further, the mid-point of position indicator 3 passes sensor 5 at an angle 25° before the mid-point of position indicator 4 and hence the duration between passage of the mid-points of position indicators 3 and 4 past sensor 5 can be used to determine to instantaneous speed of revolution of the engine.

Therefore, the microprocessor employed to enable determination of the TDC position may be programmed to flag "TDC" at a calculated duration after passage of the mid-point of position indicator 4 past sensor 5. In the present embodiment, this is conveniently a factor of 4 times the recorded duration between the pulses according to the mid-points of position indicators 3 and 4. Accordingly, a microprocessor having only a shift function, rather than a more complex multiplier function may be employed to provide accurate "TDC" timing. A percentage function allowing greater precision over timing of fuel injection and ignition events may be included where desired. Such microprocessors may readily be obtained and used by those skilled in the art. The computed time at which TDC occurs is then available as a base time against which the important events in control of the engine may be controlled. This occurs in the manner as now described.

A two stroke cycle engine being directly injected with a fuel/air mixture and having a single cylinder is generally injected with the mixture at a specific angular time BTDC. Spark ignition then follows a short time later. Such an engine and an injection system used therefor is disclosed in the applicant's PCT patent application No. PCT/AU94/00210, the contents of which are hereby incorporated by reference. The injection event commences upon the opening of a solenoid actuated injector nozzle, and the ignition event occurs at a time immediately after a capacitor in a capacitive discharge ignition system is discharged with the resultant formation of an ignition spark. Such a capacitive discharge ignition system is disclosed in the applicant's PCT patent application No. PCT/AU93/00664, the contents of which are hereby incorporated by reference. It is however to be noted that ignition does not necessarily need to be generated by a capacitive discharge ignition system and that alternative known ignition systems can be used.

Generally speaking, the end of injection timing will occur in the range 10° to 70° BTDC and ignition will generally occur in the range of 0°–50°, say 25° before BTDC, at low engine loads and speeds. Under high load operating conditions, injection of air and fuel may be commenced before the bottom dead centre (BDC) position in the engine cycle, particularly at speeds above 3000 rpm. Hence, the position and speed sensor of the present invention may be employed for determination of the timing of fuel injection and ignition events under both low and high load operating conditions.

The position and speed sensor generates a signal corresponding to the speed of rotation of the engine and, consequently, the time between passage of position indicator 3 and the TDC position. From this may be computed the time to the point before TDC at which air and fuel injection should commence. If 75° BTDC is arbitrarily selected as the time at which air and fuel injection should commence, the ECU, which is programmed with the duration between passage of position indicators 3 and 4, generates a signal, $t_1$, corresponding to this duration. The ECU then requires opening of the injector nozzle at a time, $t_1$, after passage of the midpoint of position indicator 4 past sensor 5, that is, the time at which a zero-crossing detector detects passage of the voltage induced in the reluctance type sensor 5, due to passage of the mid-point of position indicator 4, through zero.

If ignition is then required at say 50° BTDC, ignition can be effected by firing the spark plug at a time equal to $2t_1$, after detection of the zero-crossing. Such control can be effected simply by using an inexpensive shift function controller. If a percentage function is included, even greater precision can be attained. Thus, if ignition is required at 55° BTDC, the computed time $t_1$ at which injection is required after the passage of the midpoint of position indicator 4 past the sensor 5 may simply be shifted by four and multiplied by a percentage factor, 45%, to provide the time for ignition.

Similar analysis may be employed to determine timing for injection and ignition at high engine loads and speeds.

Figure 3:
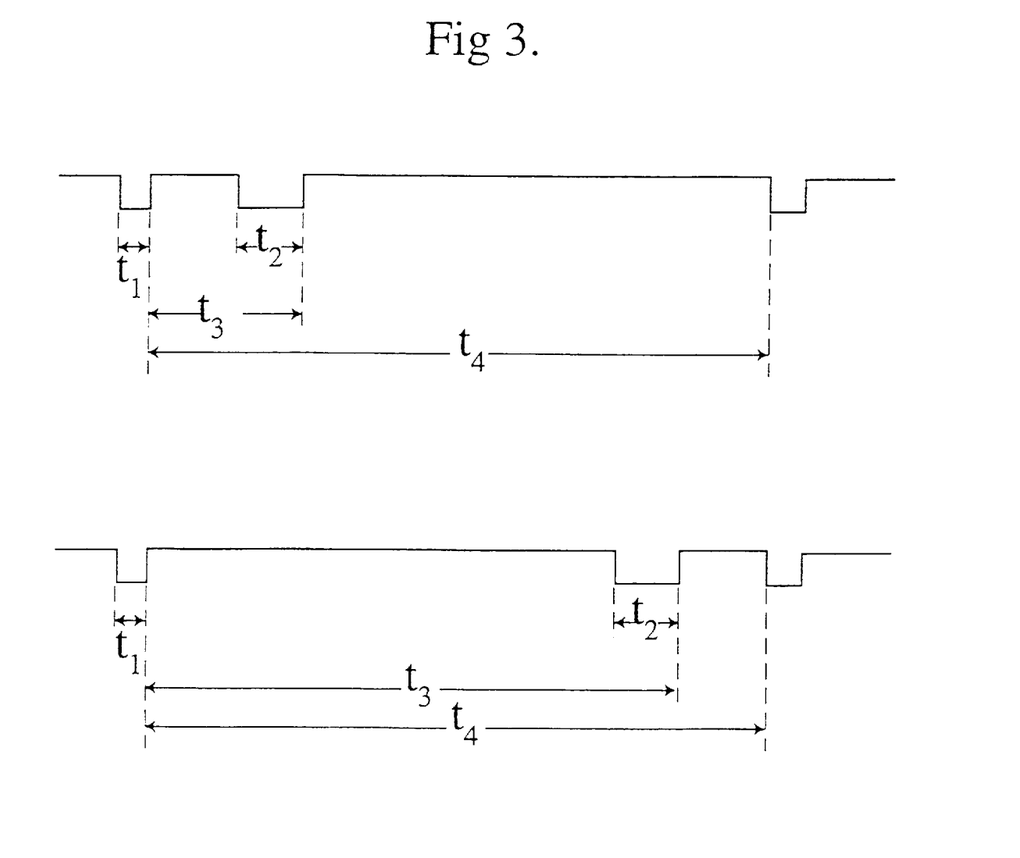
FIG. 3 shows a series of electrical signals produced by the sensor means of FIG. 1 as used for reverse rotation detection.

Turning now to a consideration of the manner in which the position and speed sensor detects whether the engine is rotating in the correct direction, reference may be made to FIG. 3 which provides an indication of one means that may be used for reverse rotation detection.

Each position indicator 3 and 4 takes a certain time to pass sensor 5. The time for passage of position indicator 3 past sensor 5 may be designated $t_1$ and that for passage of position indicator 4 past sensor 5, $t_2$. The time between passage of the trailing edge of position indicator 3 and the passage of the leading edge on the succeeding passage of position indicator 3 may be designated $t_4$. The time between passage of the trailing edge of position indicator 3 and the trailing edge of position indicator 4 may be designated $t_3$; all as conveniently shown in FIG. 3.

The microprocessor may then make a comparison between twice $t_3$ and $t_4$. If $2t_3 < t_4$, rotation is in the correct direction. If $2t_3 > t_4$, then rotation is in an incorrect direction and the engine is shutdown for recommencement of operation. As previously indicated, this may be achieved by cessation of fuel injection or ignition to the engine. FIG. 3 emphasises that $t_4$ is significantly greater than $t_3$ in the case where rotation is in the correct direction and thus the comparison may be used very effectively to determine the direction of rotation of the engine. As can be seen from FIG. 3, in the case where rotation is in the incorrect direction, $t_3$ is much closer to $t_4$. Further, the algorithm or comparison routine described above could be used to good effect in multi-tooth encoders having significantly more than two teeth, say 24 teeth, provided that there are two position indicators that can be discriminated in the same way as the two position indicators of the present invention.

Though a factor of 2 is used in the above embodiment, provided that $n < t_4/t_3$, when calculated based on correct rotation, any appropriate multiplier, n, may be employed, though factors of 2 are preferred for reasons of processing convenience.

The manufacture of the encoder wheel 1 may readily be achieved in a low cost, simple stamping operation achievable by an inexpensive stamping machine and the sensor 5 and microprocessor circuitry may be sourced relatively easily and inexpensively even in developing countries. Inexpensive stamping is possible when the encoder wheel 1 of the present invention is used as the position indicators 3 and 4 are close together and a single stamping process is all that is required to produce the final encoder wheel. Encoders may thus be inexpensively manufactured for use in, for example, scooters.

It will be appreciated by those skilled in the art that modifications or variations may be made to the above described embodiment. Such modifications and variations fall within the scope of the present invention. For example, the sensor 5 could be provided on the encoder wheel 1 whilst the position indicators 3 and 4 are located in a fixed position adjacent the encoder wheel 1 to correspond to the rotating sensor 5.

What is claimed is:

1. An engine position and speed sensor system comprising:
   a circular element rotatably driven about an axis thereof at a speed directly related to engine speed, said circular element having thereon two peripherally spaced position indicators spaced apart by a first angular extent and at least one of said position indicators spaced apart from a marker of top dead center by a second angular extent, wherein said second angular extent is a multiple of said first angular extent;
   sensor means fixed in position with respect to said circular element, the sensor means being adapted to detect the passage therepast of each of said position indicators as the circular element rotates and produce in response to said passage respective electrical signals; and
   means to process the electrical signals to produce information as to the angular position and angular velocity of the circular element.

2. An engine position and speed sensor system as claimed in claim 1 wherein said means to process the electrical signals comprises a shift function for use in producing information as to the angular position or angular velocity of the circular element.

3. An engine position and speed sensor system as claimed in claim 2 wherein said means to process the electrical signals further comprises a percentage function for use in producing information as to the angular position or angular velocity of the circular element.

4. An engine position and speed sensor system as claimed in claim 1, wherein said peripherally spaced position indicators have third and fourth angular extent respectively, wherein said third angular extent is a multiple of said fourth angular extent.

5. An engine position and speed sensor as claimed in claim 1 wherein the separation distance between the two position indicators is s elected to enable ready discrimination therebetween.

6. An engine position and speed sensor as claimed in claim 1 wherein the two position indicators are located on the circular element such that angular velocity and position information may be determined immediately prior to when it is required for scheduling ignition and injection events.

7. An engine position and speed sensor as claimed in claim 4 wherein said first position indicator is located a specific angular extent from a position on the circular element which corresponds to the top dead centre position of a piston within a cylinder of the engine.

8. An engine position and speed sensor as claimed in claim 7 wherein said second position indicator is located between said first position indicator and said top dead centre position.

9. An engine position and speed sensor as claimed in claim 4 wherein the first position indicator is located within 140° of arc from the position on the circular element corresponding to the top dead centre position.

10. An engine position and speed sensor as claimed in claim 4 wherein said second position indicator is located not less than 10° of arc in advance of said first position indicator.

11. An engine position and speed sensor as claimed in claim 4 wherein said second position indicator is located between 15° and 25° of arc in advance of the centre of said first position indicator.

12. An engine position and speed sensor according to claim 4 wherein the position indicators are arranged such that the angular extent therebetween is a factor of the angular extent between the second position indicator and the top dead centre position.

13. An engine position and speed sensor according to claim 1 wherein the position indicators are located closely adjacent to one another in a manner enabling ready manufacture by a stamping process.

14. An engine position and speed sensor as claimed in claim 1 wherein the position indicators are located at positions other than those corresponding to the top dead centre position.

15. An engine position and speed sensor as claimed in claim 1 wherein the position indicators are located at positions other than those corresponding to injection or ignition events.

16. An engine position and speed sensor as claimed in claim 4 wherein the angular extent of the first position indicator is less than that of the second position indicator.

17. An engine position and speed sensor as claimed in claim 16 wherein the larger second position indicator is sensed by the sensor means after the smaller first position indicator.

18. An engine position and speed sensor according to claim 1 wherein the engine is a single cylinder engine.

19. A method of determining the direction of rotation of an engine by use of the engine position and speed sensor claimed in claim 1 wherein the sensor means provides an electronic signal in response to the passage of the leading and trailing edge of each position indicator past the sensor means, said method comprising:

generating a respective signal in response to the passage of the leading and trailing edge of each position indicator wherein the timing, $t_3$, between passage of the trailing edges of the electrical signals corresponding to each position indicator multiplied by a factor of n is compared with the timing, $t_4$, of passage between the trailing edge of a first position indicator and the leading edge of the first position indicator on a subsequent revolution of the circular element, wherein n is less than $t_4/t_3$, such that when $nt_3<mt_4$, rotation is determined as being in a correct direction and when $nt_3>mt_4$, rotation is in an incorrect direction.

20. A method of determining the direction of rotation of an engine wherein the passage of two position indicators located on an encoder wheel is sensed by a sensor means comprising comparing data derived from an electrical signal corresponding to passage of said position indicators past said sensor means under engine operating conditions with data corresponding to an electrical signal for a first direction of rotation and indicating rotation direction in an opposite sense to said first direction where said derived data varies by a greater than acceptable margin from data corresponding to said first direction of rotation.

21. A method of determining the direction of rotation of an engine wherein the passage of two position indicators located on an encoder wheel is sensed by a sensor means to provide an electrical signal corresponding to the passage of each respective position indicator, each signal having a leading edge and a trailing edge, the timing, $t_3$, between passage of trailing edges of the electrical signals corresponding to each position indicator being multiplied by a factor of n and compared with the timing, $t_4$, of passage between the trailing edge of a first position indicator and the leading edge of the first position indicator on a subsequent revolution of the encoder wheel such that, when $nt_3<t_4$, rotation is determined as being in a correct direction and when $nt_3>t_4$, rotation is in an incorrect direction.

22. The method as claimed in claim 20 wherein n is 2 and m is 1.

23. An electronic control unit (ECU) for an internal combustion engine having an engine position and speed sensor system comprising:

a circular element rotatably driven about an axis thereof at a speed directly related to engine speed, said circular element having thereon two peripherally spaced position indicators spaced apart by a first angular extent and at least one of said position indicators spaced apart from top dead centre by a second angular extent wherein said second angular extent is a multiple of said first angular extent;

sensor means fixed in position with respect to said circular element, the sensor means for detecting the passage therepast of each of said position indicators as the circular element rotates and for producing in response to said passage respective electrical signals;

wherein said ECU is adapted to receive said electrical signals from said engine position and speed sensor system and said ECU further comprising a shift function for use in producing information as to the angular position or angular velocity of the circular element from said electrical signals received by the ECU.

24. An ECU as claimed in claim 23 wherein said ECU further comprises a percentage function for use in producing information as to the angular position or angular velocity of the circular element.

25. An ECU according to claim 23 wherein said peripherally spaced position indicators have third and forth angular extent wherein said third angular extent is a multiple of said forth angular extent.

26. An ECU according to claim 24 wherein said peripherally spaced position indicators have third and forth angular extent wherein said third angular extent is a multiple of said forth angular extent.

27. An engine position and speed sensor system as claimed in claim 2 wherein said peripherally spaced position indicators have third and fourth angular extent respectively, wherein said third angular extent is a multiple of said fourth angular extent.

28. An ECU as claimed in claim 26 wherein the separation distance between the two position indicators is selected to enable ready discrimination therebetween.

29. An ECU as claimed in claim 26 wherein the two position indicators are located on the circular element such that angular velocity and position information may be determined immediately prior to when it is required for scheduling ignition and injection events.

30. An ECU as claimed in claim 26 wherein said first position indicator is located a specific angular extent from a position on the circular element which corresponds to the top dead centre position of a piston within a cylinder of the engine.

31. An ECU as claimed in claim 26 wherein said second position indicator is located between said first position indicator and said top dead centre position.

32. An ECU as claimed in claim 26 wherein the first position indicator is located 140° of arc from the position on the circular element corresponding to the top dead centre position.

33. An ECU as claimed in claim 26 wherein said second position indicator is located not less than 10° of arc in advance of said first position indicator.

34. An ECU as claimed in claim 26 wherein said second position indicator is located between 15° and 25° of arc in advance of the centre of said first position indicator.

35. An ECU according to claim 26 wherein the position indicators are located closely adjacent to one another in a manner enabling ready manufacture by a stamping process.

36. An ECU as claimed in claim 26 wherein the position indicators are located at positions other than those corresponding to the top dead centre position.

37. An ECU as claimed in claim 26 wherein the position indicators are located at positions other than those corresponding to injection or ignition events.

38. An ECU as claimed in claim 26 wherein the angular extent of the first position indicator is less than that of the second position indicator.

39. An ECU as claimed in claim 38 wherein the larger second position indicator is sensed by the sensor means after the smallest first position indicator.

40. An ECU to claim 26 wherein the engine is a single cylinder engine.

41. An electronic control unit (ECU) for an internal combustion engine having an engine position and speed sensor system comprising:
- a circular element rotatably driven about an axis thereof at a speed directly related to engine speed, said circular element having thereon two peripherally spaced position indicators of different angular extent;
- sensor means fixed in position with respect to said circular element, the sensor means for detecting the passage therepast of each of said position indicators as the circular element rotates, for producing in response to said passage respective electrical signals respectively characterized by the angular extent of the position indicator generating same, and for providing an electronic signal in response to the passage of the leading and trailing edge of each position indicator past the sensor means;
- means for processing the electrical signals to produce information as to the angular position and angular velocity of the circular element; and
- means for generating a respective signal in response to the passage of the leading and trailing edge of each position indicator wherein the timing $t_3$, between passage of the trailing edges of the electrical signals corresponding to each position indicator multiplied by a factor of n is compared with the timing, $t_4$, of passage between the trailing edge of a first position indicator and the leading edge of the first position indicator on a subsequent revolution of the circular element, wherein n is less than $t_4/t_3$ such that when $nt_3<t_4$ the ECU is adapted to determine that rotation is in a correct direction and when $nt_3>t_4$, the ECU is adapted to determine that rotation is in an incorrect direction.

42. An electronic control unit (ECU) for an engine comprising an encoder wheel with two position indicators and a sensor for sensing passage of position indicators therepast wherein said ECU is adapted to receive electrical signals from said sensor and includes a comparator for comparing data derived from an electrical signal corresponding to passage of said position indicators past said sensor under engine operating conditions with data corresponding to an electrical signal for a first direction of rotation, the ECU being adapted to indicate rotation direction in an opposite sense to said first direction where said derived data varies by a greater than acceptable margin from data corresponding to said first direction of rotation.

43. An electronic control unit (ECU) for an engine comprising an encoder wheel with two position indicators and a sensor for sensing passage of position wherein said ECU is adapted to receive an electric signal from said sensor, corresponding to the passage of each respective position indicator therepast, each signal having a leading edge and a trailing edge, the ECU comprising a multiplier for multiplying the time $t_3$, between passage of trailing edges of the electrical signals corresponding to each position indicator by a factor of n; and
- a comparator for comparing the timing, $t_4$, of passage between the trailing edge of a first position indicator and the leading edge of the first position indicator on a subsequent revolution of the encoder wheel with $nt_3$ wherein the ECU determines that rotation is in a correct direction when $nt_3<t_4$ and the ECU determines that rotation is in an incorrect direction and when $nt_3>t_4$.

* * * * *